United States Patent
Yu et al.

(10) Patent No.: US 8,437,914 B2
(45) Date of Patent: May 7, 2013

(54) ELECTRIC MOTOR ENHANCED DRIVEABILITY IN VEHICLE HANDLING AND STABILITY CONTROL EVENTS

(75) Inventors: Hai Yu, Canton, MI (US); Jianbo Lu, Livonia, MI (US); Ming Lang Kuang, Canton, MI (US); Ryan Abraham McGee, Ann Arbor, MI (US); Joseph Youqing Xiang, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 437 days.

(21) Appl. No.: 12/781,937

(22) Filed: May 18, 2010

(65) Prior Publication Data
US 2011/0288697 A1 Nov. 24, 2011

(51) Int. Cl.
*A01B 69/00* (2006.01)

(52) U.S. Cl.
USPC .................. 701/41; 701/72; 180/197

(58) Field of Classification Search .............. 701/41, 701/72, 70, 22, 29, 38, 91; 180/197; 303/146
See application file for complete search history.

(56) References Cited

U.S. PATENT DOCUMENTS

| | | | |
|---|---|---|---|
| 5,172,626 A | 12/1992 | Hart | |
| 5,328,255 A | 7/1994 | Isella | |
| 5,710,704 A | 1/1998 | Graber | |
| 5,839,407 A | 11/1998 | Suzuki et al. | |
| 6,659,063 B2 | 12/2003 | Nomura et al. | |
| 6,935,220 B2 | 8/2005 | Dunaevsky et al. | |
| 7,606,649 B2 | 10/2009 | Sato | |
| 2005/0029863 A1* | 2/2005 | Brown et al. | 303/146 |
| 2005/0188840 A1 | 9/2005 | Yasuyama | |
| 2006/0027095 A1 | 2/2006 | Miller | |
| 2007/0050112 A1 | 3/2007 | Kroehnert | |
| 2007/0184929 A1 | 8/2007 | Piyabongkarn | |
| 2008/0100129 A1* | 5/2008 | Lubbers | 303/113.1 |
| 2010/0056338 A1 | 3/2010 | Erban | |

FOREIGN PATENT DOCUMENTS

FR 2916717 A3 12/2008

\* cited by examiner

*Primary Examiner* — Thomas Black
*Assistant Examiner* — Luke Huynh
(74) *Attorney, Agent, or Firm* — Angela M. Brunetti; Raymond Coppiellie (57) ABSTRACT

A system and method are disclosed for controlling a vehicle during a turn in which a braking torque is applied to an inside wheel of the vehicle when understeer is detected and to an outside wheel when oversteer is detected. Electrical energy commanded to an electric motor coupled to a first axle of the vehicle is increased in response to application of the braking torque to compensate for the applied braking torque.

18 Claims, 5 Drawing Sheets

ELECTRIC MOTOR ENHANCED DRIVEABILITY IN VEHICLE HANDLING AND STABILITY CONTROL EVENTS

BACKGROUND

1. Technical Field

The present disclosure relates to vehicle control systems that enhance vehicle stability and performance.

2. Background Art

It is known to one skilled in the art to apply a braking torque to an inside wheel to overcome an issue with understeer and to apply a braking torque to an outside wheel to overcome an issue with oversteer. Such an application of the brake causes the vehicle to experience a loss of longitudinal propulsion. To overcome such loss of longitudinal performance, it is known to increase engine torque to compensate for the loss in longitudinal propulsion. However, an internal combustion engine suffers from delays in providing the demanded torque, thereby compromising the overall performance of the vehicle. The inaccurate torque control and delay from an internal combustion engine can interrupt or render the normal vehicle stability event ineffective.

SUMMARY

A system and method are disclosed for controlling a vehicle during a turn in which a braking torque is applied to an inside wheel of the vehicle when understeer is detected and to an outside wheel when oversteer is detected. Oversteer is when the magnitude of actual yaw rate exceeds the magnitude of desired yaw rate by more than a first threshold yaw rate; understeer is when the magnitude of actual yaw rate is less than the magnitude of desired yaw rate by more than a second threshold yaw rate. Electrical energy commanded to an electric motor coupled to a first axle of the vehicle is increased in response to application of the braking torque to compensate for the applied braking torque. In one embodiment the first axle is a front axle, the vehicle is a front-wheel drive vehicle, and the inside wheel to which the braking torque is applied is coupled either the first or second axles of the vehicle. In an alternative embodiment, the first axle is a rear axle, the vehicle is a rear-wheel drive vehicle, and the inside wheel to which the braking torque is applied is coupled to the rear axle.

The present disclosure applies to a hybrid electric vehicle (HEV) which also has an internal combustion engine couple to the first axle, an electric vehicle (EV), a fuel cell vehicle (FCV), or any vehicle capable of electric motor direct drive.

Based on data from sensors such as accelerometers, yaw rate sensors, steering angle sensors, and estimated variables such as vehicle speed, desired yaw rates as well as desired and actual sideslip angles are determined. The method also includes determining a yaw control moment to overcome an oversteer or an understeer situation, if either are detected. The yaw control moment is based on the error in the desired and actual values. The magnitude of the braking torque applied is determined to provide the yaw control moment. In the event that the wheel to which the braking torque is applied is slipping, the braking torque to such wheel is reduced and a braking torque is applied to the other wheel on the same side of the vehicle.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
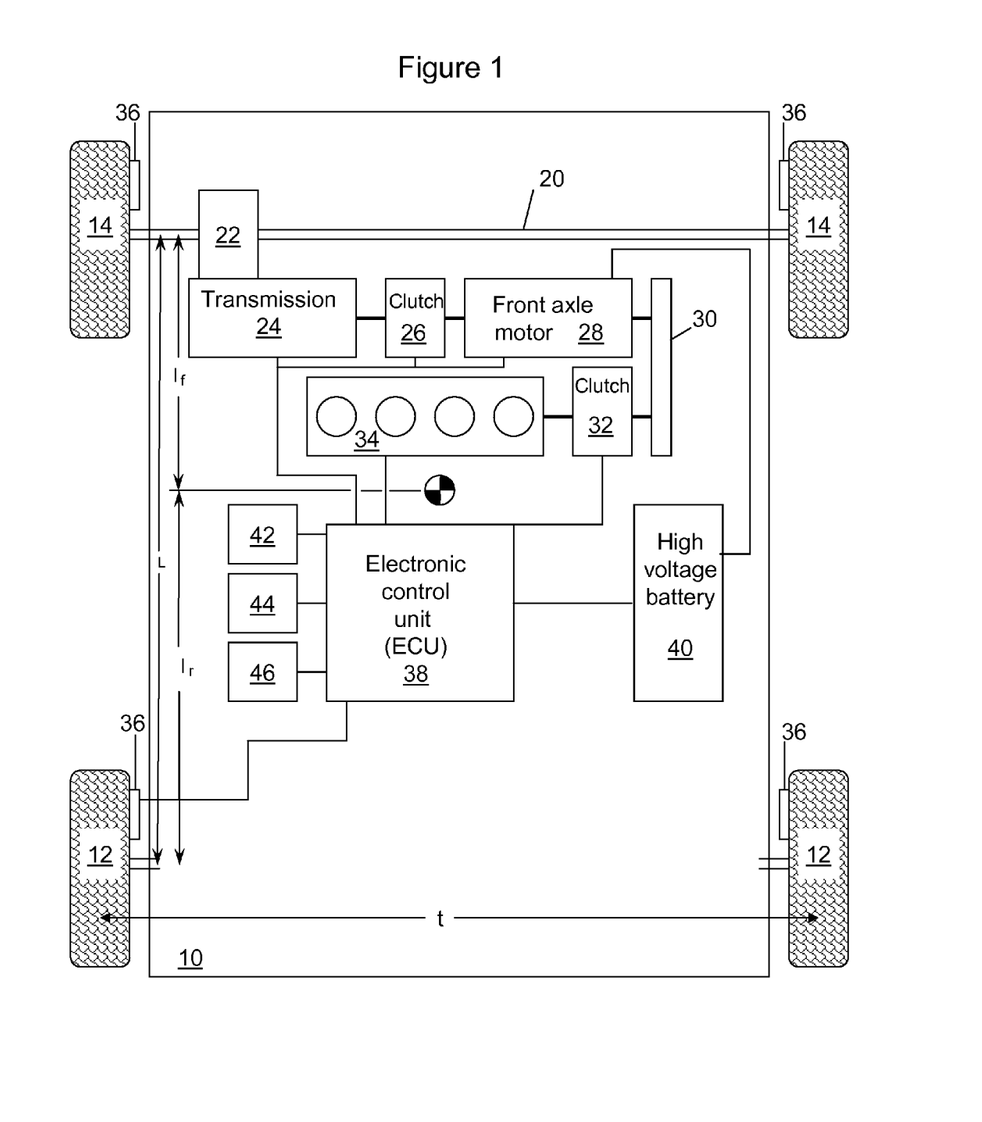
FIG. 1 shows a schematic representation of a hybrid electric vehicle (HEV)

In FIG. 1, one embodiment of a hybrid electric vehicle (HEV) 10, shown schematically, has rear wheels 12 which are coupled to vehicle 10 via stub axles. Front wheels 14 are coupled to a front axle 20. A differential and final drive gear set 22 are coupled to front axle 20. The vehicle powertrain system is coupled to differential 22 through a transmission 24. Transmission 24 is coupled to a front axle motor 28 via a clutch 28. Front axle motor 28 is coupled to an internal combustion engine 34 via a clutch 32. Front axle motor 28, in the arrangement shown in FIG. 1, can be called an integrated starter generator (ISG) because it can be used to spin up engine 34 for starting purposes. It is likely that not all of the powertrain components can be coupled end to end within the width of HEV 10. In the embodiment shown in FIG. 1, a chain drive 30 is provided between engine 34 and front axle motor 28 such that engine 34 rotates along a first axis and front axle motor 28 and transmission 24 rotate along a second axis substantially parallel to the first axis. The configuration in FIG. 1 illustrates simply one HEV configuration. There are many alternatives for configuring HEV which do not depart from the scope of the present disclosure. HEV 10 shows an arrangement in which internal combustion engine 34 is coupled to the front wheels. In another embodiment, engine 34 is coupled to the rear axle. Front axle motor 28 can operate as a motor providing torque to the associated axle or as generator absorbing torque from the associated axle, i.e., providing a braking force on wheels associated with the axle.

Continuing to refer to FIG. 1, wheels 12 and 14 are provided with traction sensors 36, which are coupled to an ECU 38. Traction sensors 36, in one embodiment, are part of an anti-lock braking system (ABS). ABS compares vehicle speed with tire speed. When the two differ by more than a predetermined amount, the tire is determined to be slipping. ABS is simply one example; any suitable traction sensor can be used.

A battery 40 is coupled to front axle motor 28 to provide electrical energy or to absorb electrical energy, depending on operational mode. Battery 40 may also be electronically coupled to ECU 38 via sensors to monitor state of charge of the battery, battery health, etc. In one embodiment, battery 40 is a high voltage battery to facilitate large power extraction from or storage into the battery.

In one embodiment, ECU 38 is coupled to a yaw rate sensor 42, a sensor coupled to a steering wheel 44, and a variety of other sensors 46, such as a vehicle speed sensor, temperature sensors, transmission sensors, pressure sensors, and acceleration sensors. In embodiments without yaw rate sensor 42, yaw rate may be estimated based on signals from other sensors 46.

An HEV is shown in FIG. 1. In an alternative embodiment, the vehicle is an electric vehicle (EV). In such an embodiment, the following components are not included: clutch 26, chain drive 30, clutch 32, and engine 34. In some embodiments, transmission 24 is also not included.

In FIG. 1, track width, t, wheel base, L, distance from the center of gravity to the front axle, $l_f$, and distance from the center of gravity to the rear axle, $l_r$, are illustrated.

Figures 2A, 2B, 2C:
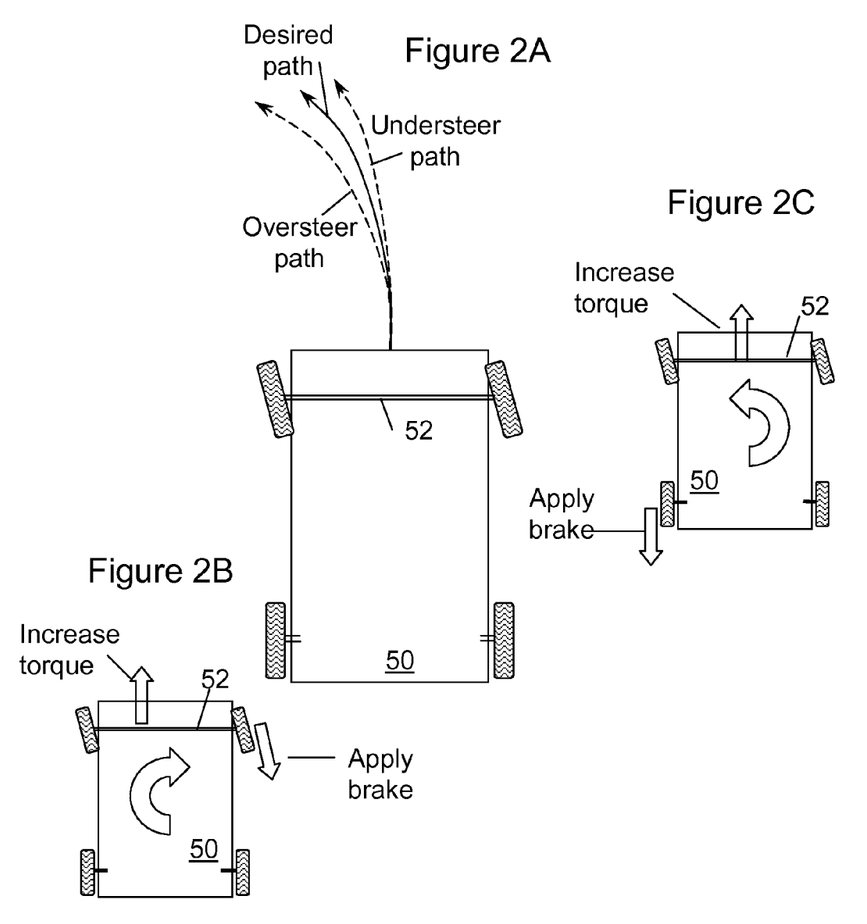
FIG. 2A shows a HEV on a desired turning path and oversteer and understeer paths.
FIG. 2B shows how torque increase to a front axle of a HEV affects yaw rate in an oversteer case.
FIG. 2C shows how torque increase to a rear axle of a HEV affects yaw rate in an understeer case.

In FIG. 2A, a vehicle 50, either a HEV or EV, is shown during a turning maneuver. Wheels coupled to a front axle 52 are caused to turn via a steering input by the driver to the steering wheel (not shown). By the amount that the driver has turned the steering wheel, a desired path 56 for vehicle 50 can be determined. An example of an oversteer path 58 and an understeer path 60 are shown in FIG. 2A.

To cause vehicle 50 to track along desired path 56 instead of oversteer path 58, a brake coupled to the front outside wheel is applied. Although such an action can be used to correct steering, there is a noticeable decrease in the forward motion of the vehicle. To overcome that, torque provided to front axle 52 is increased so that vehicle 10 provides both the driver requested propulsion and steering. Engine 34, front axle motor 28, or a combination of the two could be used to provide an increase in torque. However, torque increase from front axle motor 28 is much more rapid and accurate than a torque increase from engine 34. Engine 34 suffers from intake manifold filling delays that hamper the engine's ability to rapidly increase engine torque. Because torque regulation promptness and accuracy is important in vehicle stability control and vehicle propulsion/traction compensation, the electric motor is preferred. If the torque control request is not accurately or promptly satisfied, which is commonly observed when using engine-based technologies only, the performance is compromised which can cause the vehicle to lose stability and customer dissatisfaction. To rapidly respond to a determination that vehicle 50 is on an oversteer path 58, torque generated by front axle motor 28 is increased. In one example, front axle motor 28 is being operated as a motor, or not at all, when the command for increased torque is received. In this case, front axle motor 28 is commanded to provide a positive torque. In another example, front axle motor 28 is being operated as a generator when the command for increased torque is received. In this case, front axle motor 28 is commanded to reduce electrical generation. If a greater increase in torque is required than can be achieved by reducing electrical generation, front axle motor 28 is commanded to change from operating as a generator to operating as a motor. If further torque increase is requested, the engine torque can also be increased to supply the desired torque. Meanwhile, the electric motor is either motoring or generating to compensate for inaccuracy between the total powertrain output torque and the driver's demand.

In the event that understeer is determined, the brake associated with rear inside wheel is applied, as shown in FIG. 2C. This overcomes the understeer issue, but decreases the longitudinal propulsion of vehicle 10. Such decrease in longitudinal propulsion is overcome by increasing torque provided by the front axle motor 28. Front axle motor 28 is employed because of the much more rapid response of front axle motor 28 compared to engine 34. Not only can front axle motor 28 respond quickly to a command for increased torque, but front axle motor 28 can react rapidly to updates in the command for increased torque so that the actual torque provided can quickly react to changes in the requested torque. In some situations, there is insufficient torque capability in front axle motor 28 alone, e.g., when front axle motor 28 is being commanded to provide torque near the limit of its capacity to front axle 20 prior to the command for torque compensation is received. In such situations, torque may be increased in both the front axle motor 28 and the engine 34 to achieve the desired torque increase. As described above and shown in FIG. 5 below, engine 34 has difficulty reacting quickly. Of course, a rapid increase in torque when front axle motor 28 is at its limit cannot be completely achieved. However, front axle motor 28 can quickly raise and lower torque to at least partially makeup for sluggish reaction of engine 34.

The terms inside and outside wheel refer to a left wheel and a right wheel, respectively, in a left hand turn and refer to a right wheel and a left wheel, respectively, in a right hand turn.

There are multiple cases in which the present disclosure applies. In all examples, a desired yaw control moment, Mdes, is determined based on driver and sensor inputs. In understeer, a yaw moment in the turning direction is generated; in oversteer, a yaw moment counter to the turning direction is generated.

| Description | Computation of $T_B$ and $T_{PC}$ |
|---|---|
| Rear-wheel drive; braking at inside rear wheel | $T_B = (-2 R_w/t) * M_{des}$; $T_{PC} = T_B/r_d$ |
| Front-wheel drive; braking at inside front wheel | $T_B = \{R_w (\cos \delta_i + \cos \delta_o)/[l_f \sin \delta_o - (t/2) \sin \delta_o) \cos \delta_i - [l_f \sin \delta_i + (t/2) \sin \delta_i] \cos \delta_o\} * M_{des}$; $T_{PC} = 2 \cos \delta_i T_B/[(\cos \delta_i + \cos \delta_o) * r_d]$ If $\delta_i = \delta_o$, then $T_B = [-2R_w/(t \cos \delta)] * M_{des}$; $T_{PC} = T_B/r_d$ |
| Front-wheel drive; braking at inside rear wheel | $T_B = \{R_w (\cos \delta_i + \cos \delta_o)/[l_f \sin \delta_i + \sin \delta_o) - t \cos \delta_o)\} * M_{des}$; $T_{PC} = 2 T_B */[(\cos \delta_i + \cos \delta_o) * r_d]$ If $\delta_i = \delta_o$, then $T_B = \{2R_w \cos \delta/[(2 l_f * (\sin \delta) - t \cos \delta\} * M_{des}$; $T_{PC} = T_B/(\cos \delta * r_d)$ |
| Rear-wheel drive; braking at outside rear wheel | $T_B = (2 R_w/t) * M_{des}$; $TP_C = T_B/r_d$ |
| Front-wheel drive; braking at outside front wheel | $T_B = \{R_w * (\cos \delta_i + \cos \delta_o)/[l_f * \sin \delta_i + (t/2) * \cos \delta_i] - [l_f * \sin \delta_o - (t/2) * \cos \delta_o] * \cos \delta_i\} * M_{des}$; $T_{MC} = 2 \cos \delta_o * T_B * /[(\cos \delta_i + \cos \delta_o) * r_d]$ If $\delta_i = \delta_o$, then $T_B = \{2 R_w/[t * \cos \delta]\} * M_{des}$; $T_{PC} = T_B/r_d$ |
| Front-wheel drive; braking at outside rear wheel | $T_B = \{R_w (\cos \delta_i + \cos \delta_o)/[l_f (\sin \delta_i + \sin \delta_o) + t \cos \delta_o)\} * M_{des}$; $T_{PC} = 2 T_B */[(\cos \delta_i + \cos \delta_o) * r_d]$ If $\delta_i = \delta_o$, then $T_B = [2R_w * \cos \delta/(2 l_f \sin\delta + t \cos \delta)] * M_{des}$; $T_{PC} = T_B/(\cos \delta * r_d)$ | where $T_B$ is the braking torque, $R_w$ is wheel radius, t is a track width of the vehicle, $\delta_i$ is a steering angle of the inside wheel, $\delta_o$ is a steering angle of the outside wheel, $\delta$ is a steering angle of steering wheels, and $r_d$ is the differential gear ratio. In some embodiments, only an overall steering angle, $\delta$, is known, i.e., not enough information is provided to determine individual wheel steering angles. $T_{PC}$ is a powertrain control torque that compensates the total propulsion torque loss due to brake application. It is an additional torque exerted by the powertrain components, the engine and the motor, in this active control event besides the original powertrain propulsion torque $T_{PP}$ such that the total powertrain torque output at the driven axles is: $T_P=T_{PC}+T_{PP}$.

$T_{PC}$ is supplied by a combination of the internal combustion engine and the electric motor. Or, in some embodiments, $T_{PC}=T_{MC}$, i.e., the electric motor provides all of the increased torque. Because of the increased accuracy and response rate of the electric motor compared to the internal combustion engine, the electric motor is a contributor to $T_{PC}$. In the initial phase of a request for $T_{PC}$, the electric motor is likely to contribute 100%, with the internal combustion engine providing over the duration of the request; but, the electric motor continues to be active to tune the actual torque provided to match the requested torque.

In the table above, the computations of the nominal yaw control torque applied by brake and the traction compensating torque exerted by the motor and the engine are provided for both front wheel driven and rear wheel driven vehicle examples. The same control scheme also applies to the combination of rear-wheel drive; braking at a front wheel, although the equations for this case are not explicitly included.

Figure 3:
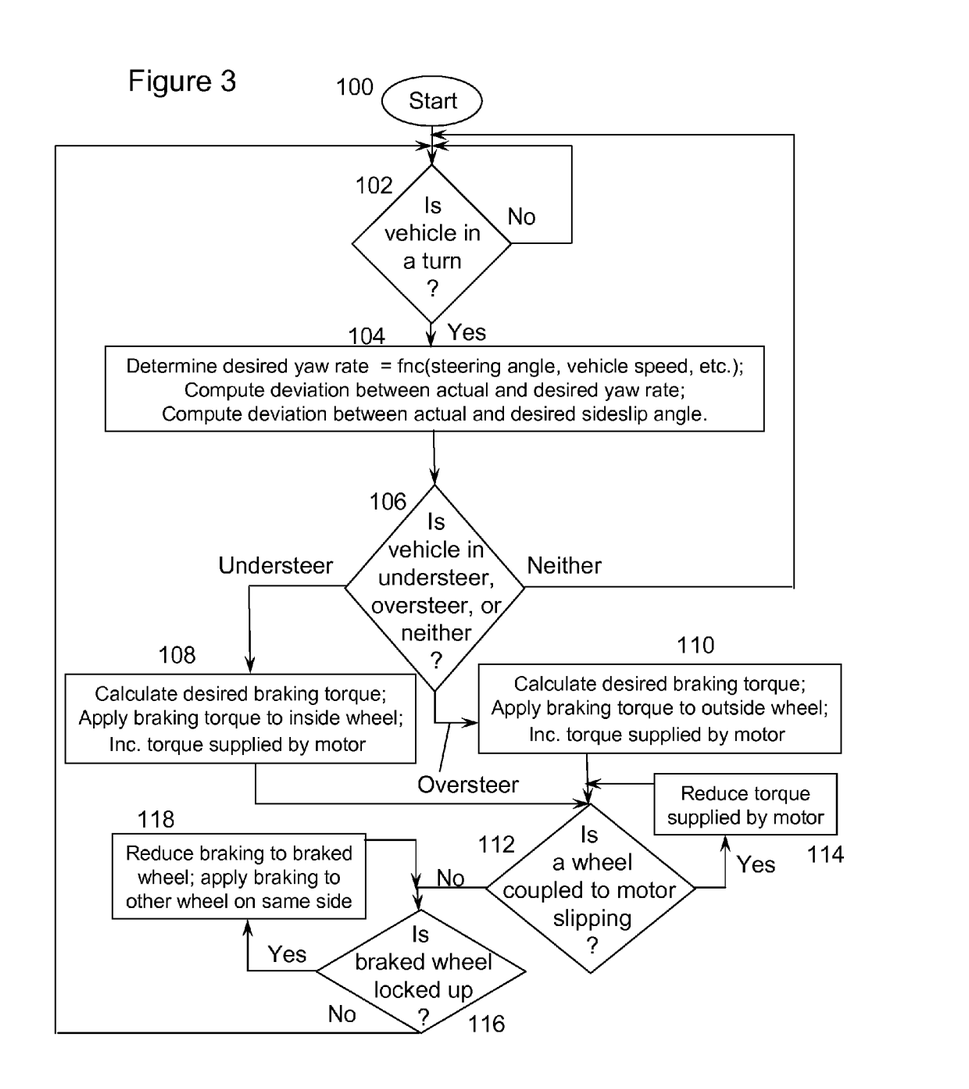
FIG. 3 is a flowchart illustrating an embodiment of the disclosure.

In FIG. 3, an embodiment of the disclosure starts in block 100 and continues to block 102. Control stays in block 102, until the vehicle is undergoing a turn. In one embodiment, the turn causing a positive result in block 102 is greater than a predetermined threshold, i.e., slight steering corrections from a straight line do not rise to the level of being considered a turn for the purposes of block 102. If a turn is detected, control passes to step 104 in which a desired yaw rate based on the steering angle input from the driver and vehicle speed is determined; and actual yaw rate based on vehicle sensors is determined. The deviation between the actual and desired yaw rates and the deviation between the actual and desired sideslip angles are computed. In step 106, based on the desired and actual yaw rates, it is determined whether the vehicle is understeering, oversteering, or neither, i.e., following the desired path. If neither, no action is taken and control passes to 102 to repeat the test.

If understeer is detected in block 106, control passes to block 108. In block 108, a desired braking torque is computed for the inside front wheel according to one embodiment or the inside rear wheel according to another embodiment. Such computed braking torque is commanded to the inside wheel. The computed braking torque is that which causes the actual yaw rate to approach the desired yaw rate, but also causes a reduction in longitudinal propulsion. To overcome the lower longitudinal propulsion, torque supplied by the electric motor is increased in such a manner as to make up for the loss of longitudinal propulsion due to the braking.

If oversteer is detected in block 106, control passes to block 110, which is analogous to block 110 except that braking torque is applied to an outside wheel. From block 108 and 110, control passes to block 112 in which it is determined whether a wheel coupled to the electric motor is slipping. That is, it is desirable to make up for the lost longitudinal propulsion with the electric motor; however, not if it causes a wheel being driven by the electric motor to slip. If so, control passes to block 114 in which the torque supplied by the electric motor is reduced. If not, control passes to block 116 in which it is determined whether the braked wheel is locked up. If a positive result in block 116, control passes to block 118 in which the braking torque to the braked wheel is decreased and a braking torque is applied to the other wheel on the same side. I.e., if the braking torque was applied to a rear inside wheel in block 108, then in block 118, the braking torque is reduced to the rear inside wheel and applied to the front inside wheel. The application of braking to the other wheel on the same side of the vehicle is accomplished in such a manner as to provide the desired yaw rate. Control passes back to 116 to determine if either braked wheel is locked up. If so, control passes to block 118. The second time through 118, the braking torque to any locked up wheels is simply reduced. In such a case, the desired yaw rate cannot be provided because there is insufficient traction to do so. If no wheel is locked up in block 116, control returns to block 102. The order of the blocks shown in FIG. 3 can be changed without departing from the scope of the disclosure.

Figure 4:
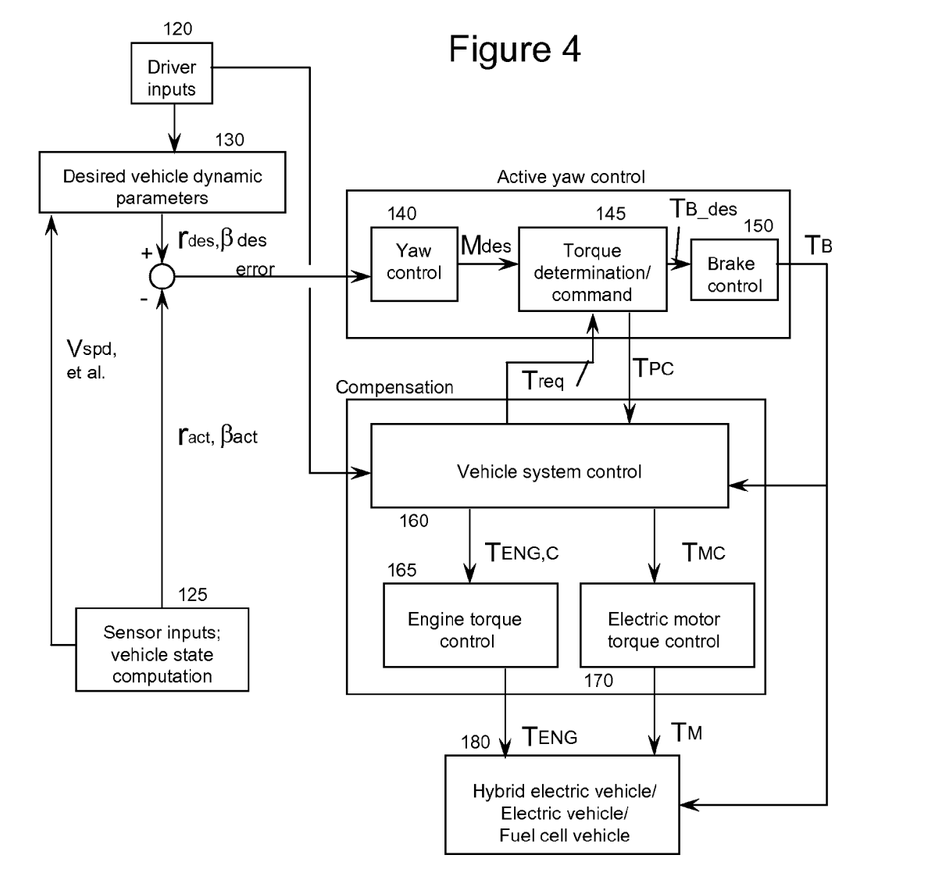
FIG. 4 is a control chart according to an embodiment of the disclosure.

A control diagram is shown in FIG. 4. Driver inputs 120, including accelerator pedal position and steering wheel angle, are provided to block 130. In block 125, vehicle state is computed based on vehicle sensors, such as accelerometers, a speedometer (to determine vehicle speed), a yaw rate sensor, etc. At least vehicle speed is provided to block 130. Additional information, such as roll rate, can be provided to block 130, if available. Based on driver and sensor inputs, desired vehicle dynamic parameters are determined. The pedal position indicating a demand for torque is provided to block 160. The desired yaw rate, $r_{des}$, and the desired sideslip angle, $\beta_{des}$, as computed in block 130 are compared with the actual yaw rate, $r_{act}$, and the actual sideslip angle, $\beta_{act}$, which are computed in block 125 based on sensor data. The error in yaw rate and the error in sideslip angle are provided to block 140 for yaw rate control. If there is no error in yaw rate, the vehicle is tracking as the operator of the vehicle is requesting. However, in the case of understeer or oversteer, the error in yaw rate is nonzero. Based on the error, a desired yaw control moment, $M_{des}$, is determined in block 140.

Continuing to refer to FIG. 4, the driver requested torque, $T_{drv}$, is determined in block 130 based on pedal position. Driver requested torque is provided to block 160. In some situations, it is not possible or advisable to provide $T_{drv}$, such as if traction conditions indicate that a wheel is near a slip limit or situations in which the internal combustion engine is inactive, i.e., situations in which only the electric motor is providing for propulsion and the electric motor is operating at or near its limit; in such situations, little or no additional torque is available to compensate for braking torque applied to a wheel. In the event that the available torque from the electric motor is sufficient to compensate for the braking torque and there are no wheel slip or stability concerns, the driver requested torque passes through block 160 to blocks 145 and a vehicle system controller in block 155. In block 145, based on the desired yaw control moment and the requested torque, a desired braking torque, $T_{B\_des}$, is determined and commanded to the brake control 150. Due to uncertainties in the characteristics of the road surface, the vehicle, and the brakes, the actual braking torque, $T_B$, is different than that commanded. In block 160, torque to compensate for the reduction in propulsion due to braking is determined with a torque to command to the electric motor, $T_{MC}$, and a torque to command to the engine, T eng_comp, are determined. There are two components to the total torque commanded to the electric motor, $T_M$, output of block 165: the portion of the torque based on driver requested torque, $T_{req}$, designated to the electric motor and the portion of the compensation torque for the electric motor to provide, $T_{MC}$. Similarly, there are two components to the torque commanded to the engine, $T_{ENG}$, output of block 170: the portion of the torque based on driver requested torque, $T_{req}$, designated for the engine to provide and the compensation torque, $T_{ENG,C}$. Block 170 is also provided a feedforward signal of the motor controlled torque, $T_{MC}$, as well as the actual braking torque, $T_B$. The motor torque, $T_M$, the engine torque, $T_{ENG}$, and the brake torque, $T_B$, are commanded to the vehicle in 180.

The embodiment in FIG. 4 is suitable for an HEV, i.e., vehicles having an electric motor and an internal combustion engine providing propulsion. In any all-electric vehicle, the electric motor is providing all of the propulsive torque. Thus, there would be no block 165 in FIG. 4 or computation of the quantities related to the internal combustion engine. Furthermore, block 160 can be combined with block 170 in such electric-only applications.

Figure 5:
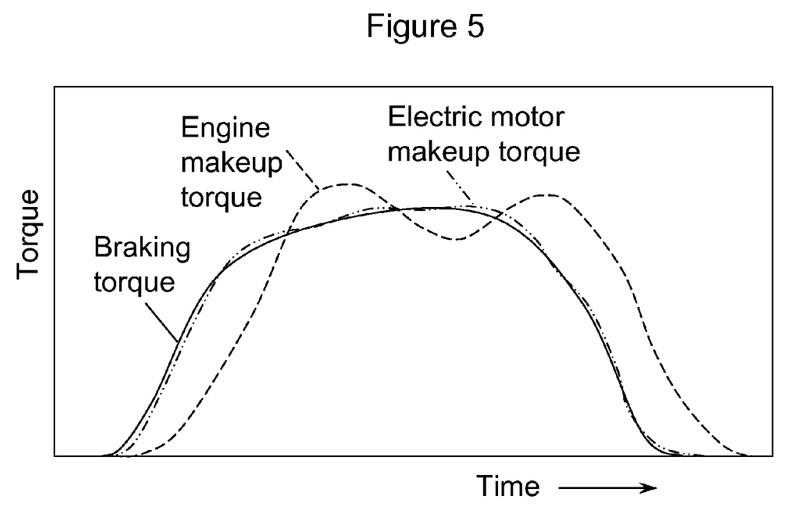
FIGS. 5 and 6 are graphs comparing an electric motor and an internal combustion engine for compensation control.
Figure 6:
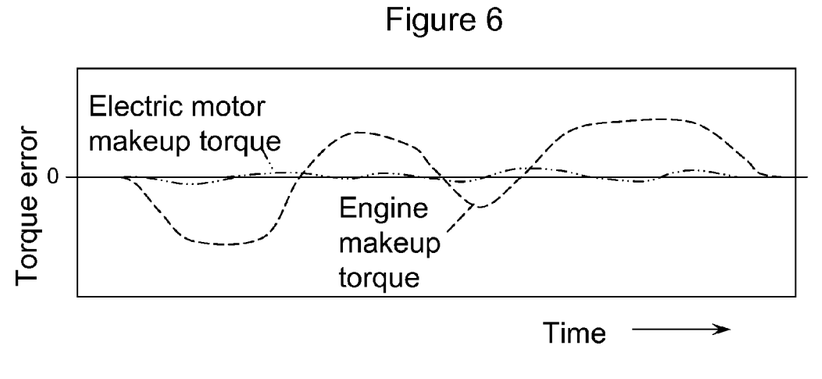

An example in FIG. 5 shows a braking torque that is applied to provide a desired yaw rate. Braking torque is negative; but, is shown positive, i.e., the absolute value of braking torque. If an internal combustion engine were used to provide makeup torque, it lags. Thus, it fails to rise to make up for the braking torque at the initial stages and then overshoots and overcorrects. In the final stages, the engine lags in dropping to zero when makeup torque is no longer needed. The electric motor can very quickly adjust to provide the makeup torque so that the electric motor makeup torque very closely tracks with the braking torque in FIG. 5. In FIG. 6, the sum of the braking torque (negative) and the engine makeup torque is plotted with a dashed line. If control were perfect, the curve would lie on the zero line. Instead, there are positive and negative deviations. The sum of braking torque and electric motor makeup torque (dash-dot-dot line) lies very close to zero indicating superior control over the internal combustion engine. The motor torque used to compensate for propulsion loss due to brake application adds disturbance to the yaw control loop. Such a disturbance is compensated by the active yaw control loop through brake torque control. The electric motor torque control is in an internal, slave control loop whose promptness and accuracy are the key control factors. Otherwise, the motor torque compensation control and the active yaw control might fight each other and potentially lead to an unstable state. Referring back to FIG. 4, the disclosure includes two-loop control structure, with a primary outside loop, i.e., active yaw control, and a slave inside loop, i.e., electric motor torque compensation control loop.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. For example, it may be desirable to have an extensive set of sensors to provide an accurate determination of vehicle state. The optimal number of such devices with respect to accuracy is likely to clash with the optimal number with respect to cost. A suitable compromise, depending on the application, may be selected. The embodiments described as being less desirable relative to other embodiments with respect to one or more characteristics are not outside the scope of the disclosure as claimed.

What is claimed:

1. A method to control a vehicle during a turn, comprising:
    applying a braking torque to an inside wheel of the vehicle when understeer is detected;
    compensating for the braking torque by increasing electrical energy to an electric motor coupled to a first axle of the vehicle in response to application of the braking torque.

2. The method of claim 1 wherein the first axle is a front axle, the vehicle is a front-wheel drive vehicle, and the inside wheel to which the braking torque is applied is coupled to one of the first axle and a second axle of the vehicle.

3. The method of claim 1 wherein the first axle is a rear axle, the vehicle is a rear-wheel drive vehicle, and the inside wheel to which the braking torque is applied is coupled to the rear axle.

4. The method of claim 1, further comprising:
    applying a braking torque to an outside wheel of the vehicle when oversteer is detected.

5. The method of claim 1 wherein the vehicle is a hybrid electric vehicle having an internal combustion engine coupled to the first axle, the internal combustion engine provides a majority of the propulsive torque, and the electric motor provides compensating propulsive torque.

6. The method of claim 1, further comprising:
    determining a yaw control moment to correct for understeer wherein a magnitude of the braking torque is based on the determined yaw control moment.

7. A method to control a vehicle during a turn, comprising:
    applying a braking torque to an inside wheel of the vehicle when understeer is detected;
    increasing electrical energy to an electric motor coupled to a first axle of the vehicle in response to application of the braking torque;
    determining a yaw control moment to correct for understeer wherein a magnitude of the braking torque is based on the determined yaw control moment;
    determining whether the inside wheel to which the braking torque is applied is slipping;
    reducing braking torque to the inside wheel; and
    applying a braking torque to another inside wheel.

8. The method of claim 7, further comprising:
    determining a yaw control moment to correct for oversteer wherein a magnitude of the braking torque is based on the determined yaw control moment.

9. A method to control a vehicle during a turn, comprising:
    applying a braking torque to an outside wheel of the vehicle when oversteer is detected;
    compensating for the braking torque by increasing electrical energy to an electric motor coupled to a first axle of the vehicle in response to application of the braking torque.

10. The method of claim 9 wherein the vehicle is a front-wheel drive vehicle having an electric motor coupled to the first axle, and the outside wheel to which the braking torque is applied is coupled to one of the first axle and a second axle of the vehicle.

11. The method of claim 9 wherein the vehicle is a rear-wheel drive vehicle having an electric motor coupled to the first axle, which is a rear axle, and the outside wheel to which the braking torque is applied is coupled to the rear axle.

12. A method to control a vehicle during a turn, comprising:
    applying a braking torque to an outside wheel of the vehicle when oversteer is detected;
    compensating for the braking torque by increasing electrical energy to an electric motor coupled to a first axle of the vehicle in response to application of the braking torque;

determining a yaw control moment to correct for oversteer wherein a magnitude of the braking torque is based on the determined yaw control moment;

determining whether the outside wheel to which the braking torque is applied is slipping;

reducing braking torque to the outside wheel; and applying a braking torque to another outside wheel.

13. A vehicle, comprising:

a first axle;

an electric motor coupled to the first axle; and an electronic control unit (ECU) electronically coupled to the electric motor, brakes, and vehicle sensors wherein the ECU:

determines whether vehicle trajectory during a turn tracks an operator requested trajectory;

commands a braking torque to an inside rear wheel of the vehicle when understeer is detected; and commands the electric motor to increase torque to the electric motor coupled to the first axle of the vehicle in response to application of the braking torque and to at least partially compensate for a decline in forward propulsion due to the braking torque.

14. The vehicle of claim 13 wherein the ECU commands a braking torque to an outside rear wheel of the vehicle when oversteer is detected.

15. The vehicle of claim 13 wherein the vehicle sensors comprise at least a steering angle sensor coupled to a steering wheel and at least one of a yaw sensor and an acceleration sensor, and a steering angle sensor.

16. The vehicle of claim 13 further comprising:

an internal combustion engine coupled to the first axle.

17. The vehicle of claim 16 wherein a majority of vehicle propulsive torque is provided by the internal combustion engine, a compensation torque is provided by the electric motor, and the magnitude of the compensation torque is determined to provide the lesser of the driver requested torque, a wheel spin torque, and a vehicle stability control torque.

18. The vehicle of claim 13 wherein the ECU commands a braking torque to an inside front wheel of the vehicle when understeer is detected.

\* \* \* \* \*